United States Patent [19]

Kobayashi

[11] Patent Number: 5,798,892
[45] Date of Patent: Aug. 25, 1998

[54] MAGNETIC TAPE APPARATUS HAVING MEANS FOR ALIGNING MAGNETIC TAPE TO MAGNETIC HEAD AND METHOD THEREOF

[75] Inventor: Masayoshi Kobayashi, Kawasaki, Japan

[73] Assignee: Fujitsu Limited, Kawasaki, Japan

[21] Appl. No.: 695,416

[22] Filed: Aug. 12, 1996

[30] Foreign Application Priority Data

Aug. 22, 1995 [JP] Japan .................... 7-213123

[51] Int. Cl.⁶ .................... G11B 5/56; G11B 15/60
[52] U.S. Cl. .................... 360/109; 360/130.22
[58] Field of Search .................... 360/109, 107, 360/106, 105, 130.22

[56] References Cited

U.S. PATENT DOCUMENTS

| | | | |
|---|---|---|---|
| 4,275,427 | 6/1981 | Bjordahl | 360/109 |
| 4,344,099 | 8/1982 | Kawachi et al. | 360/109 |
| 4,586,098 | 4/1986 | Pretto | 360/109 |
| 4,713,706 | 12/1987 | Oosaka et al. | 360/109 |
| 4,809,108 | 2/1989 | Tanaka et al. | 360/109 |
| 5,331,490 | 7/1994 | Richards et al. | 360/109 |
| 5,508,865 | 4/1996 | La Garcia et al. | 360/109 |

*Primary Examiner*—Allen Cao
*Attorney, Agent, or Firm*—Greer, Burns & Crain, Ltd.

[57] ABSTRACT

A magnetic tape apparatus for reading/writing data from/to a magnetic tape by magnetic heads. The magnetic tape apparatus includes a roller guide for guiding the magnetic tape, a magnetic head assembly having several magnetic heads, and a structure for aligning the magnetic tape to the magnetic heads, wherein the vertical position of the magnetic tape is determined by a lower flange of the roller guide. One feature of the present invention relates to the structure of the roller guide wherein the lower flange is separable from other members of the roller guide such that the vertical position of the magnetic head is the lower flange. Another feature of the present invention is a method for aligning the magnetic heads to a track of the magnetic tape wherein the vertical position of a keen edge formed on the lower flange assembled in the roller guide is detected by microscope.

18 Claims, 5 Drawing Sheets

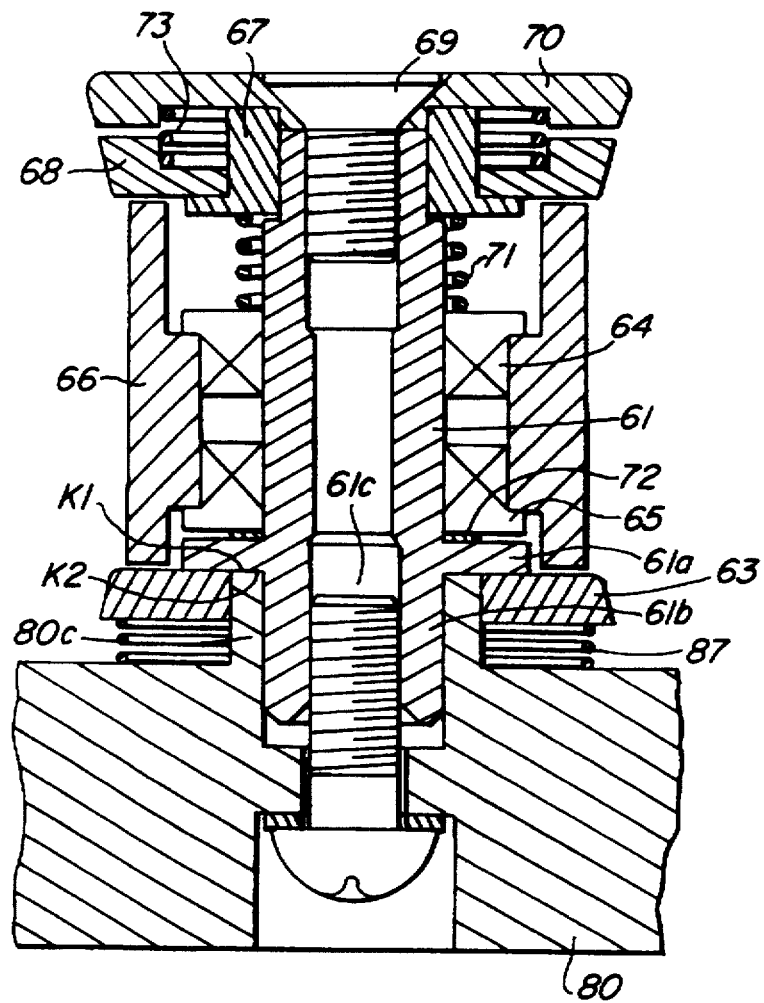
Fig. 10
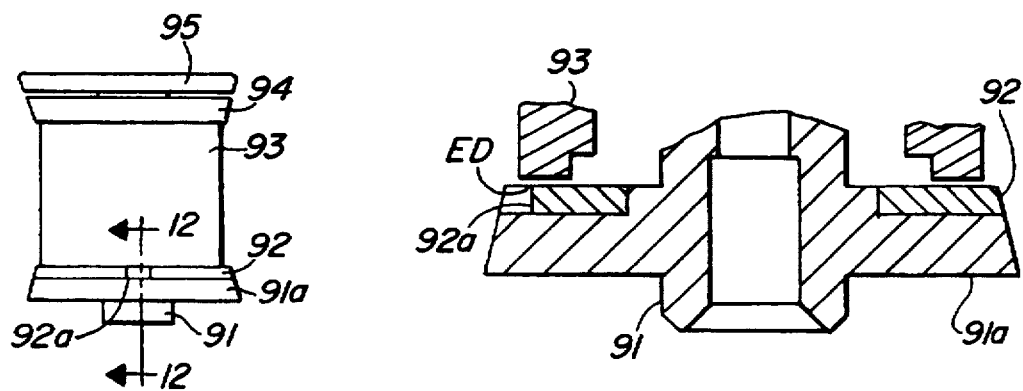
Fig. 11
Fig. 12

5,798,892

MAGNETIC TAPE APPARATUS HAVING MEANS FOR ALIGNING MAGNETIC TAPE TO MAGNETIC HEAD AND METHOD THEREOF

FIELD OF THE INVENTION

This invention relates in general to a magnetic tape apparatus which can read/write data from a magnetic tape using a magnetic head, and more particularly to a means for aligning the magnetic tape to the magnetic head and a method thereof.

DESCRIPTION OF THE PRIOR ART

A magnetic tape apparatus reads or writes data from/to a magnetic tape using a magnetic head. Notably, the magnetic tape must be aligned with the magnetic head. Alignment becomes particularly important when reading/writing from/ to a multitrack tape. Data recorded under an off-track condition (head misaligned) can not be correctly read by other machines. Moreover, correctly recorded data can not be read correctly under an off-track condition (head misaligned). A vertical position of the tape-track on the magnetic head is adjusted by moving a pair of roller guides vertically relative to the magnetic head.

FIG. 1 shows a cross-sectional view of a conventional roller guide, wherein a shaft 1 is fastened to a base(not shown) with a bolt. The shaft 1 is usually made of stainless steal because of its good machinability. The shaft 1 has a flange 1a at a lower part, to which a ceramic flange 3 adheres, and a bottom part 1b has an opening 1c, by which the roller guide is fastened to the base with the bolt.

A cylindrical roller 6 is concentrically supported at a middle part between a pair of upper and lower bearings 4, 5. The bearings enable the roller 6 to rotate around the shaft with the magnetic tape running on the surface. A cylindrical holder 7, at an upper part of the shaft, has a flange engaged with the shaft. An upper flange 8 is engaged with the cylindrical holder 7 so as to maintain freedom of movement along the axis the shaft (vertical direction). A cap 10 is fastened to the top of the shaft with a stove bolt 9. A first compressed coil spring 11 is mounted around the shaft 1 between the upper bearing 4 and the lower flange 3. A ring spacer 12 is inserted between the lower bearing 5 and a step part of the shaft. Notably, the first compressed coil spring 11 can eliminate axial play of the bearings, thereby also eliminating axial play of the roller 6. Furthermore, a second compressed coil spring 13 is mounted around the shaft 1 between the upper flange 8 and the cap 10. The second compressed coil spring 13 pushes the upper flange toward the lower flange such that a running tape on the roller 6 is pressed to the upper surface of the lower flange 3. Therefore, the vertical position of the magnetic tape can be determined by the vertical position of the lower flange 3. Total thickness of the ceramic flange 3 and the stainless steal flange 1a is denoted by L.

FIG. 2 is a cross-sectional view of a major part of a conventional apparatus for aligning a magnetic tape to a magnetic head and shows a positional arrangement of a pair of the roller guides 21, 22, and the magnetic head assembly 25 on the base 23. In particular, the roller guides 21, 22 are fastened to the base by a pair of carriage bolts 24a, 24b from the back side of the base. Each of the bottom part of the respective shafts is engaged with corresponding ones of grooves 23a, 23b formed on the base. The magnetic head assembly 25 is also fastened to a sunken area of the base 23 with carriage bolts 26 (two of them are shown) from the back side of the base. The magnetic head assembly 25 has a reading head 27 with a reading gap denoted by GR and a writing head 28 with a writing gap denoted by GW. The roller guides 21, 22 each have a lower flange 21a, 22a, respectively. Since the lower flanges 21a, 22a can not be changed in vertical position from the base, aligning the vertical position of the lower flanges 21a, 22a to the vertical position of the magnetic head must be carried out by moving the magnetic head assembly 25.

FIG. 3 illustrates a conventional method for aligning a tape track to a corresponding magnetic head. A magnetic head assembly 25 is fastened to a base 23 by carriage bolts 26. Each magnetic head has a read gap GR and a write gap GW. A U-shaped parallel piped aligning jig 31 having a keen edge ED at each end of fingers is disposed on the base 23 such that the both fingers are fastened to the corresponding position of the base 23 with bolts, respectively. As a practical matter, each vertical position of the keen edges and the lowest reading/writing track of the magnetic head are measured successively by tool maker's microscope, and subsequently the difference between them denoted by D is calculated. Since the total thickness L shown in FIG. 1 of the lower flange 3 and the flange part 1a of the shaft is fixed, the vertical position of the magnetic head assembly 25 is adjusted by inserting a spacer such that the tape track coincides with the corresponding magnetic head.

The adjustment of the vertical position of the magnetic head assembly 25 assumes that the total thickness L is always constant. In other words, any dimensional error in L directly becomes an error of the vertical position of the magnetic head assembly. Unfortunately, since the lower flange 3 is fastened to the flange part 1a with an adhesive material, any inhomogenity in thickness of the adhesive material may cause the error. Further, since L is much larger than the adjustable dimension on the magnetic head, even a small error in L may easily cause off-track condition on the magnetic head. Hence, the conventional technique always requires a careful fabrication process by using the adhesive material and an additional processing steps for adjusting any error. These all have imposed a cost increase on the end product.

SUMMARY OF THE INVENTION

Accordingly, a primary object of the present invention is to provide an apparatus for aligning a magnetic tape precisely to a magnetic head on a magnetic tape apparatus which can read/write data from/to the magnetic tape.

Another object of the present invention is to provide a method for aligning a magnetic tape precisely to a magnetic head in a magnetic tape apparatus which can read/write data out/in the magnetic tape.

According to one aspect of the present invention, there is provided an apparatus for aligning a magnetic tape precisely to a magnetic head in a magnetic tape apparatus which can read/write data to/from the magnetic tape, comprising a pair of roller guides, each of which has a shaft being disposed on a base, an upper flange and a lower flange, a roller which can rotate around the shaft, and a magnetic head assembly having magnetic heads for reading/writing data being disposed between the two roller guides on the base, wherein the lower flange can be adjusted in height from the base to determine the vertical position of the magnetic tape.

According to another aspect of the present invention, there is provided an apparatus for aligning a magnetic tape precisely to a magnetic head in a magnetic tape apparatus which can read/write data to/from the magnetic tape, comprising a pair of roller guides, each of which has a shaft being disposed on a base, an upper flange and a lower flange, a roller which can rotate around the shaft, and a magnetic head assembly having magnetic heads for reading/writing data being disposed between the two roller guides on the base, wherein the lower flange has a notch on its outer periphery which has a keen edge at an intersection between the upper surface of the lower flange and one of side walls forming the notch, whereby the upper surface of the lower flange can be precisely adjusted in height from the base such that the vertical position of the magnetic tape can be accurately determined on the magnetic head.

According to further aspect of the present invention, there is provided a method for aligning a magnetic tape precisely to a magnetic head on a magnetic tape apparatus which can read/write data from/to the magnetic tape, a major part of the magnetic tape apparatus comprising a pair of roller guides, each of which has a shaft being disposed on a base, an upper flange and a lower flange, a roller which can rotate around the shaft, and a magnetic head assembly having magnetic heads for reading/writing being disposed between the two roller guides on the base, wherein the magnetic tape runs between the two rollers with a constant tension so that the magnetic tape has a contact with a magnetic head, the method comprising the steps of measuring the vertical position of the upper surface of the lower flange by tool maker s microscope, measuring the vertical position of the reference track on the magnetic head by tool maker s microscope; comparing a difference in a vertical position between the two; and adjusting the difference such that the reference track on the magnetic head coincides with a corresponding tape track.

BRIEF DESCRIPTION OF THE DRAWINGS

The present invention will be more apparent from the following description, when taken to conjunction with the accompanying drawings, in which:

FIG. 10 is a cross-sectional view of a roller guide on a base with a coil spring therebetween according to the present invention.

FIG. 11 is a side view of a roller guide with a lower flange having a notch according to the present invention.

FIG. 12 is a cross-sectional view of the lower part of the roller guide with a lower flange at a cross-section including the notch related to FIG. 11.

DESCRIPTION OF THE PREFERRED EMBODIMENTS

Reference will now be made in detail to the preferred illustrated embodiments of the invention, examples of which are illustrated in the accompanying drawings. While the invention will be described in conjunction with the preferred embodiments, it will be understood that they are not intended to limit the inventions to these embodiments. On the contrary, the invention is intended to cover alternatives, modifications and equivalents, which may be included within the spirit and scope of the inventions defined by the appended claims.

Figure 4:
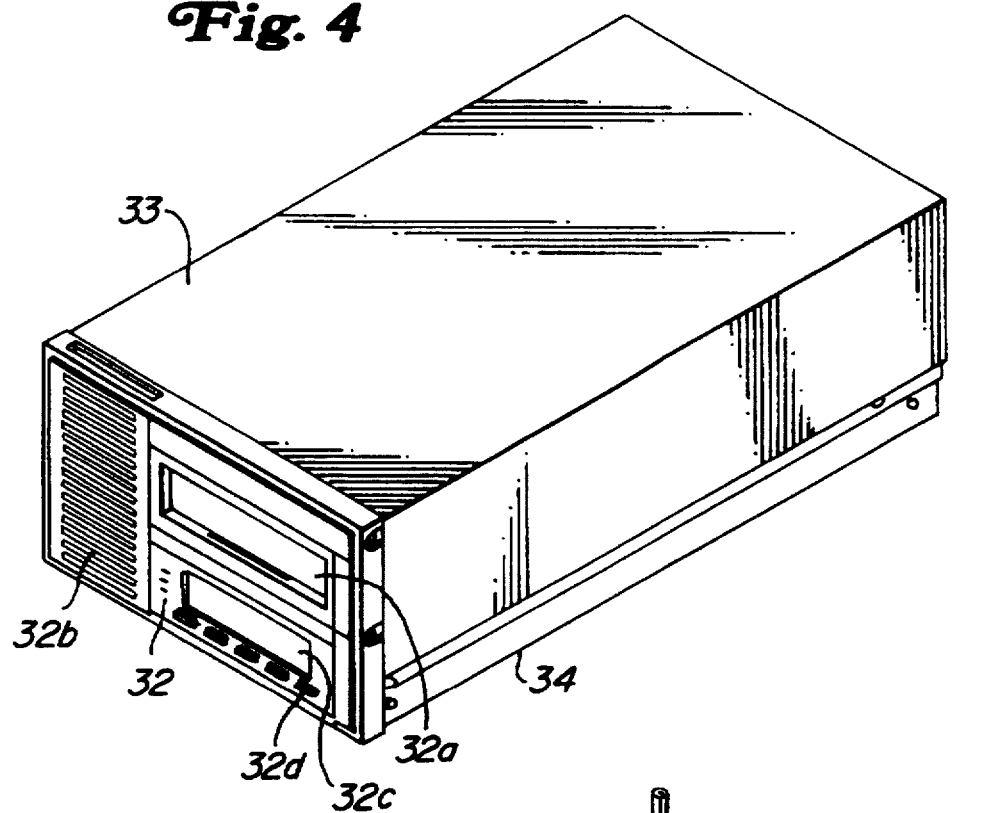
FIG. 4 is a perspective view of a magnetic tape apparatus according to the present invention.
Figure 5:
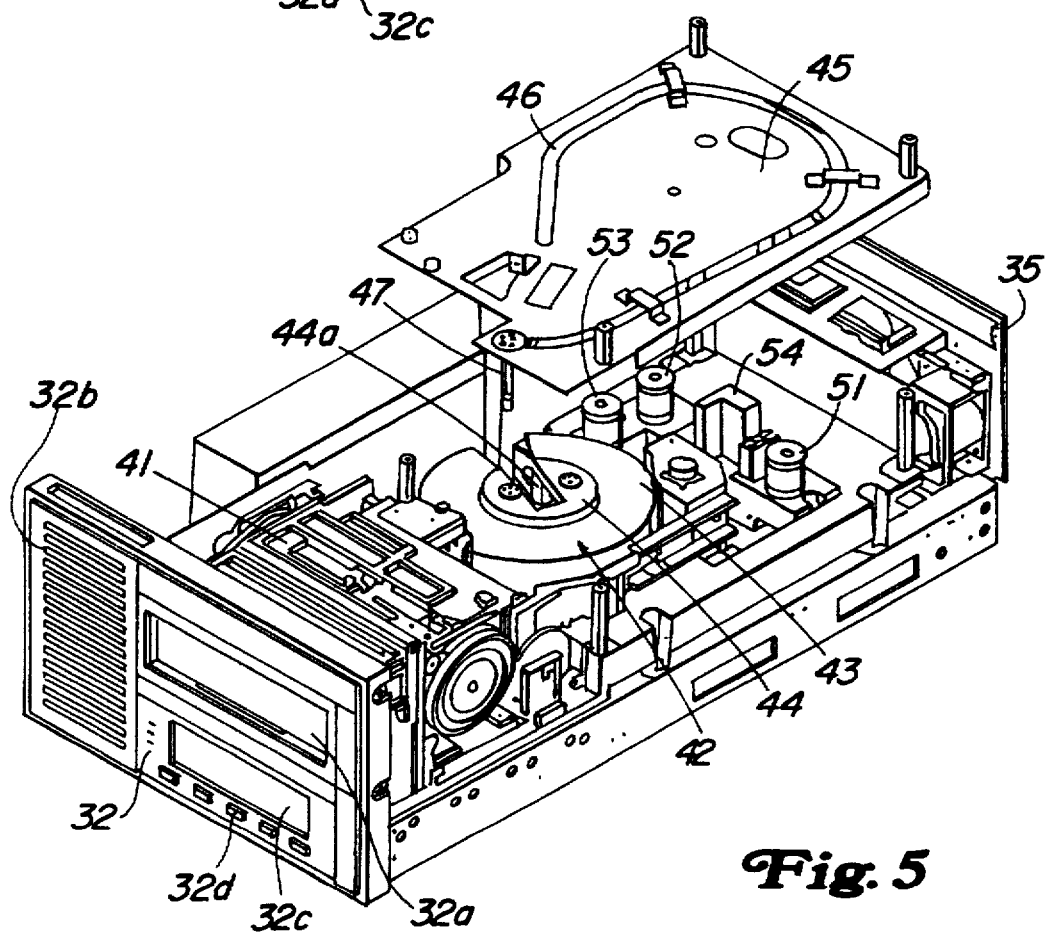
FIG. 5 is a partially exploded perspective view of the magnetic tape apparatus related to FIG. 4 according to the present invention.

FIG. 4 is a perspective view of a magnetic tape apparatus according to the present invention, and FIG. 5 is a partially exploded perspective view of the magnetic tape apparatus related to FIG. 4.

In FIG. 4, the magnetic tape apparatus according to the present invention is covered with a front panel 32, an upper cover 33, a bottom panel 34 and a back panel 35. The front panel 32 has a cartridge compartment 32a, an opening grid for cooling 32b, a display unit 32c and an operation unit 32d. A distinguished feature implemented in the embodiment for the present invention is related to a roller guide and its peripheral structures, and the other mechanisms such as loading/unloading a cartridge, pulling out a magnetic tape from the cartridge, and reading/writing data from/to the magnetic tape are almost the same as the conventional machine.

FIG. 5 is a partially exploded perspective view of the magnetic tape apparatus related to FIG. 4 according to the present invention.

In FIG. 5, the magnetic tape is wound on a machine real 42 inside the cartridge, and a leader block is attached to an end of the tape. At the end of the cartridge compartment 32a, a loader 41 is installed which can set the cartridge to a right position or eject it. The machine real 42 has a hub 44 which can engage with the leader block at a groove 44a, and be rotated by a machine real motor 43. A threader 45 has a threading pin 47 sliding along a guiding slit 46. The threading pin 47 pulls out the leader block such that the leader block can engage with the groove 44a of the hub 44. By this threading pin 47, the magnetic tape is wound around the roller guides 51, 52, and 53, and then fixed to the hub 44a. The magnetic head assembly 54 is disposed between the roller guides 51 and 52, which can read/write data out/in. The back panel 35 is also shown. The magnetic tape apparatus described above and shown in FIGS. 4 and 5 is operated as follows:

When a cartridge is set on the loader 41, the threading pin 47 of the thread 43 picks up the lead block and sends it successively to the roller guide 51, the magnetic head assembly 54, the roller guides 52, 53 and the hub 44. Ultimately, the leader block is engaged within the groove 44a. Next, a file reel motor and a machine reel motor 43 are driven in the same direction so that the magnetic tape is pulled out of the cartridge, guided by the roller guides 51–53, and finally wound by the hub 44. During this period, data is read/written by the magnetic head assembly 54 as the magnetic tape is pulled out of the cartridge. The magnetic tape is rewound by driving the file reel motor and the machine reel motor 43 in a direction reverse to the reading direction.

Figure 6:
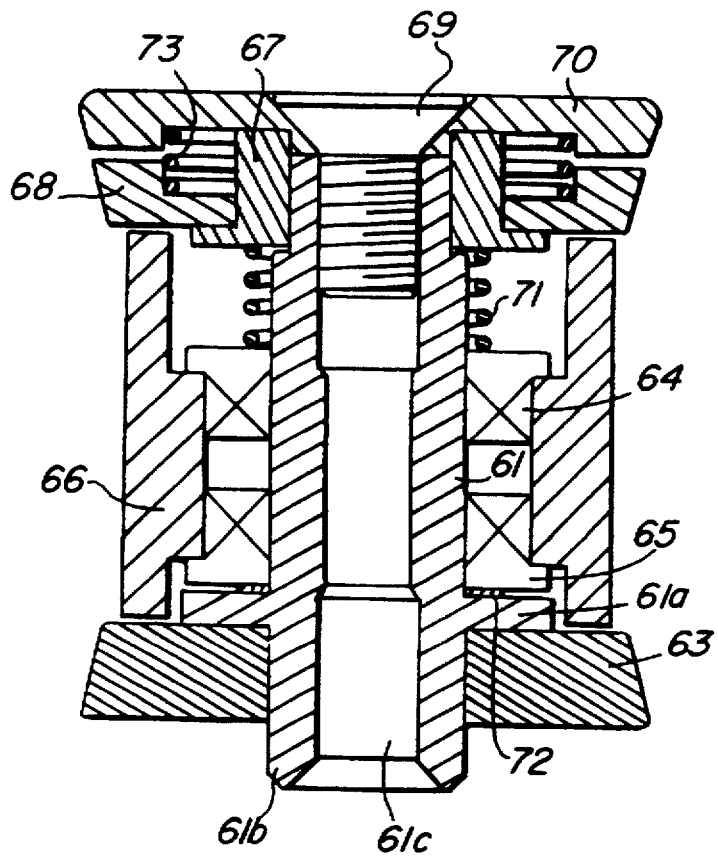
FIG. 6 is a cross-sectional view of a roller guide in a magnetic tape apparatus according to the present invention.

FIG. 6 is a cross-sectional view of a roller guide in a magnetic tape apparatus according to the present invention. All roller guides 51, 52, and 53 shown in FIG. 5 have an identical structure.

In FIG. 6, a cylindrical shaft 61 is fastened to a base (not shown) with a bolt, which is usually made of stainless steal because of its good machinability. The cylindrical shaft 61 has a flange 61a at a lower part of the shaft monolithically which is used to determine the vertical position of the magnetic tape. A ceramic lower flange 63 is engaged with the shaft in contact with the back surface of the flange 61a such that it can move up and down along the shaft. Further, a bottom part 61b has a screw hole 61c, by which the roller guide is fastened to the base with the stove bolt. A cylindrical roller 66 is concentrically supported for rotation at a middle part of the shaft 61 between a pair of upper and lower bearings 64, 65. A cylindrical holder 67 having a flange is engaged with an upper part of the shaft 61. An upper flange 68 is engaged with the cylindrical holder 67 while maintaining a freedom of movement along the axis of the shaft (vertical direction). A cap 70 is fastened with a stove bolt 69 at the top of the shaft 61. A first compressed coil spring 71 is mounted around the shaft 61 between the upper bearing 64 and the cylindrical holder 67. A ring spacer 72 is inserted between the lower bearing 65 and the monolithic flange part 61a of the shaft 61. Consequently, the first compressed coil spring 71 can eliminate axial play of the bearings, and also eliminate axial play of the roller 66. Further, a second compressed coil spring 73 is mounted around the shaft 61 between the upper flange 68 and the cap 70. The second compressed coil spring 73 pushes the upper flange 68 toward the lower flange 63 such that a running tape on the roller 66 is pressed to the upper surface of the lower flange. Consequently, the vertical position (height) of the magnetic tape can be determined by the vertical position of the lower flange 63.

Figure 7:
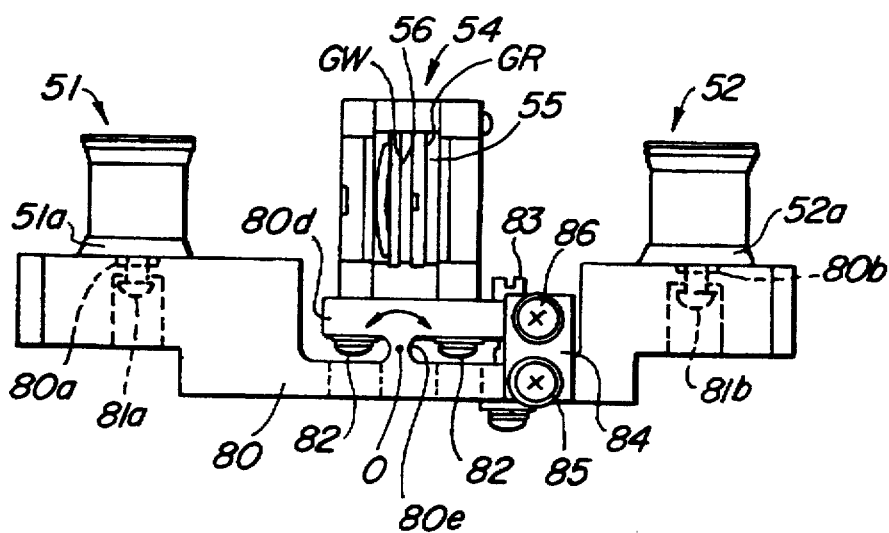
FIG. 7 is a cross-sectional view of the roller guides and the magnetic head assembly on the base related to FIG. 6.
Figure 8:
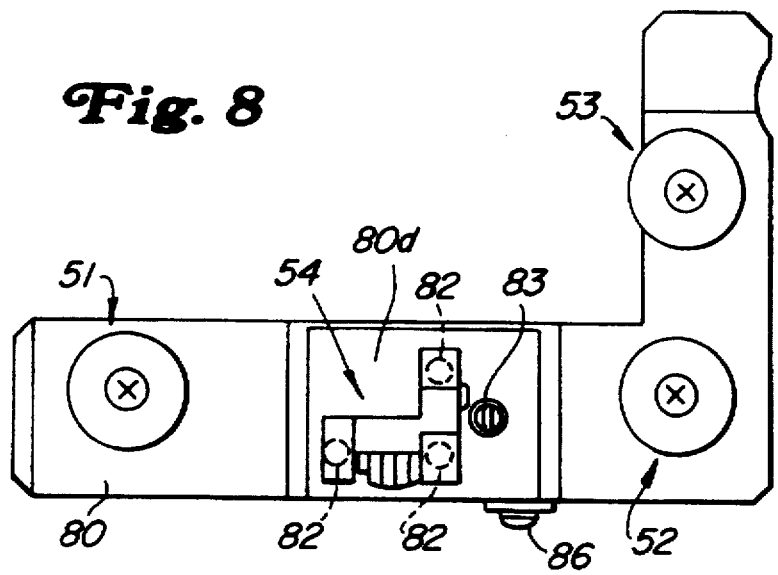
FIG. 8 is a plan view of the roller guides and the magnetic head assembly on the base related to FIG. 7.

FIG. 7 and FIG. 8 are cross-sectional and plan views of the roller guides and a magnetic head assembly on a base, respectively according to the present invention.

In FIGS. 7 and 8, a structural configuration of the roller guides 51–53 and the magnetic head assembly 54 on the base 80 is shown wherein the roller guides 51–53 are disposed with constant spacing. Each prominent part (61b in FIG. 6) of the roller guides 51–53 is engaged with the corresponding stepped hole 80a, 80b, or 80c (80c is not shown) on the front surface of the base and then fastened to the base by screwing each carriage bolt 81a, 81b, or 81c (81c is not shown) in the corresponding threaded hole (61c in FIG. 6) from the back surface of the base. The magnetic head assembly 54 is fastened to a stage 80d between the roller guides 51 and 52 on the base by three carriage bolts 82. The stage 80d is supported on the base by a central part 80e with a pair of deep notches on both sides, whereby the stage can incline in directions denoted by a bilateral arrow from an axis intersecting a point O. To adjust an inclination angle, an adjusting bolt 83 is screwed in the base 80 and the stage 80d. The adjusting bolt 83 has a first thread mating with the base 80 and a second thread mating with the stage 80d on it, which are divided by a notch in the middle of the bolt and that is different in pitch. Thereby, the inclination angle of the stage 80d can be finely adjusted by winding the bolt 83. After adjusting the inclination angle, the stage is fixed to the base by screwing carriage bolts 85, 86 through a plate 84, wherein the plate 84 has each penetrating hole for the carriage bolts 85, 86 and that the hole is enlarged or prolonged in shape to adjust a distance between the bolts. The magnetic head assembly 54 has several magnetic heads on which a read gap GR and a write gap GW are mounted and can read/write data out/in any tape track selected from a plurality of tape tracks (for instance, 18 tracks). In other words, there are a plurality of read heads 55 and write heads 56 for the corresponding tape tracks, respectively.

Figure 9:
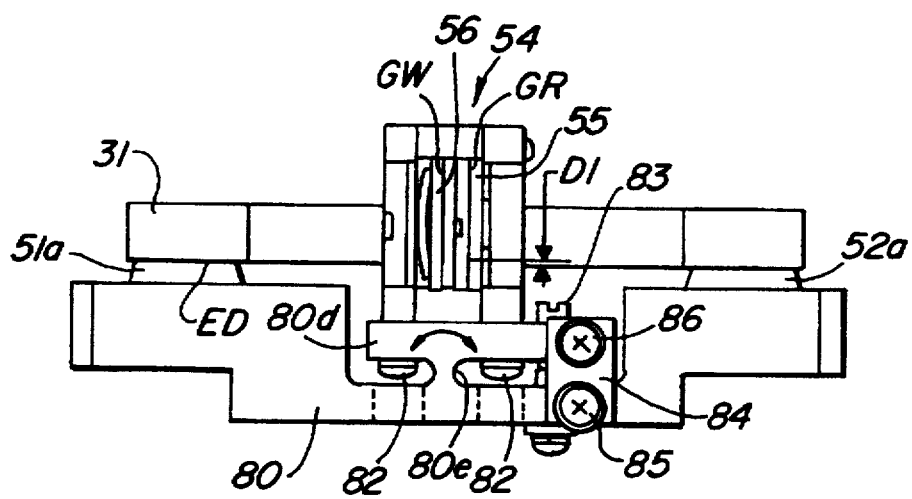
FIG. 9 is a cross-sectional view of a pair of the lower flanges and a magnetic head assembly with a U-shaped aligning jig on a base according to the present invention.

FIG. 9 is a cross-sectional view of the lower flanges and a magnetic head assembly with a U-shaped aligning jig on the base related to FIG. 7. The reference numerals and symbols in FIG. 9 are the same as those in FIG. 7.

The magnetic head assembly 54 must be fixed in a right vertical position on the base 80 to form a write track in a right position on a magnetic tape for embodiments according to the present invention, just as for the prior art shown in FIG. 3. As a practical matter, the magnetic head assembly 54 is fixed to the stage 80d so that each upper surface of the lower flanges 51a, 52a of the respective roller guides 51, 52 is determined in the vertical position with a certain distance (height in FIG. 6) from the vertical position of the reference track on the write head 56. For this purpose, a U-shaped parallel piped aligning jig 31 having a keen edge ED at each end of the fingers is mounted on the lower flanges 51a, 52a so that the keen edge ED at each end of the fingers is disposed on the corresponding upper surface of the lower flanges 51a, 52a as shown in FIG. 9, and then a distance D1 in the vertical position between the keen edge ED and the reference track on the write head 56 (for instance, the write head writing on the lowest track of a magnetic tape) is measured directly by tool maker s microscope. Subsequently, the distance D1 is adjusted to a certain value required for the above condition by inserting a spacer (not shown) between the magnetic head assembly 54 and the stage 80d, and then the magnetic head assembly 54 is finally fixed to the stage 80d. As a specific example, the lower flange is 3 mm±10 μm thick, a tape track is 630 μm wide, a space between the nearest neighbors is 540 μm wide, and an appropriate difference D1 is 1000±10 μm wide.

In this embodiment, since the lower flanges 51a, 52a are engaged with the corresponding shaft of the roller guides 51, 52 beneath the flange part 61a, and that they are separable from the shaft of the roller guides, they can be directly measured in height by mounting themselves on the base 80 when the magnetic head is adjusted in height as shown in FIG. 9. The direct measurement of the separable lower flanges on the base enables accurate alignment of the magnetic head to the magnetic tape track. These features, further, make a fabrication processing steps for glue-bonding of the lower flanges unnecessary, which can reduce the cost of the final product. As an additional comment, it is usually possible to lap the ceramic lower flanges so as to be identical in thickness in such a degree that there is no step in height between the upper surfaces of the flanges on the same base. However, if it is not easy to make the thickness of the both flanges identical by any reason for a deficiency in the fabrication facility or increasing the processing cost, a configuration as shown in FIG. 10 may be another solution.

FIG. 10 is a cross-sectional view of a roller guide on a base with a coil spring therebetween according to the present invention.

In FIG. 10, the base 80 has a cylindrical part 80c on the surface concentric to the shaft 61. The shaft 61 has a flange part 61a on the lower part such that the lower surface of the flange part 61a is pressed to the upper surface of the cylindrical part 80c, whereby the lowest position of the shaft is determined to the base. The first and second reference levels K1, K2 are set on the upper surface of the cylindrical part 80c and the lower surface of the flange part 61a, respectively. The second reference level K2 coincides with the lower edge (the reference level) of the magnetic tape. A compressed coil spring 87 as an elastic material is mounted between the base 80 and the lower flange 63, whereby the lower flange 63 is pressed to the second reference level K2. The other part of the roller guide is identical to that of FIG.

6. The configuration described above improves an accuracy in controlling the vertical position (namely, height from the base) of the magnetic head only if the height of the first reference level K1 of the cylindrical part 80c, made of stainless steel, from the base is accurately machined, which eliminates precision machine works for the thickness of the ceramic lower flange itself. It is advantageous in machine works that the accurate height of the first reference level K1 from the base can be easily fabricated because it is easy for a cutting machine to access to the upper surface of the cylindrical part 80c, and that the height of the first reference level K1 can be easily made to coincide accurately with each other among a plurality of the roller heads because of their good reproducibility. As a modification of the configuration shown in FIG. 10, the first reference level K1 is set on the upper surface of the flange part of the base 80, the second reference level K2 is set on the shaft to which the first reference level K1 is pressed, the third reference level K3 is set on the shaft to which the second reference level K2 has a certain step. The third reference level K3 is selected to the reference level for the running magnetic tape, and the lower flange 63 is pressed to this third reference level K3. Same as before, this configuration can improve an accuracy in controlling the vertical position (namely, height from the base) of the magnetic head without any precision machine work for the thickness of the lower flange.

FIG. 11 is a side view of a roller guide with a lower flange having a notch according to the present invention. The magnetic tape apparatus in this embodiment is basically the same in mechanical structures and operations as the conventional one except for the roller guide, particularly to the lower flange having a notch on the periphery.

In FIG. 11, a roller guide has a shaft 91, a flange part 91a of the shaft, an upper and a lower flange 94, 92, a roller 93 between them, and a cap 95 where the lower flange has a notch 92a on the periphery. The notch 92a is geometrically defined by three side walls among which only a center side wall can be seen but the other two cannot in FIG. 11.

FIG. 12 is a cross-sectional view of the lower part of the roller guide with a lower flange at a cross-section denoted by a line A—A in FIG. 11.

In FIG. 12, the lower surface of the lower flange 92 is glued firmly to the upper surface of the flange part 91a, and the notch 92a has a keen edge denoted by ED where the upper surface of the flange part 91a is intersected with the center side wall facing to the outside. The keen edge ED should be disposed at a deeper position with respect to the center of the shaft 91 than the position of the outer surface of the roller 93. This positional feature prevents the keen edge from damaging the running magnetic tape. Since the vertical position of the keen edge ED as well as the reference track on the magnetic head can be directly measured by tool maker s microscope, an accurate adjustment in height of the magnetic head can be achieved. Further, since the conventional U-shaped parallel piped aligning jig having a keen edge in each finger is no more needed, the working efficiency in determining the height of the magnetic head or the lower flanges can be improved, which will results in cost reduction.

Needless to say, the present invention is not limited only to the notch on the lower flange described above but also may cover any structural feature which provides a fine clear-cut visible image on the lower flange, whereby the vertical position of the upper surface of the lower flange can be easily measured directly by tool maker s microscope. It should be also noticed that these structural feature for the present invention can be applied to other type of the roller guide, such as one shown in FIG. 10.

What is claimed is:

1. A magnetic tape apparatus for reading data out or writing data in a magnetic tape by running the magnetic tape, comprising:

a roller guide having a shaft, an upper flange, a lower flange, and a cylindrical roller, the shaft being fixed to a base such that the shaft is perpendicular to a front surface of the base, the cylindrical roller being concentrically rotatable with a bearing around the shaft on which the magnetic tape is running between the upper and lower flanges, the lower flange being located at a lower end of the cylindrical roller, and the upper flange being located at an upper end of the cylindrical roller such that a lower edge of the magnetic tape is constantly pressed to an upper surface of the lower flange;

a magnetic head assembly having a pair of magnetic gaps parallel to each other along which a pair of magnetic heads are formed side by side for reading and for writing, respectively, the magnetic head assembly being disposed on the base such that the magnetic gaps are perpendicular to the magnetic tape and that each of the magnetic heads coincide with a corresponding track of the magnetic tape in a vertical position when the magnetic tape is running in a direction perpendicular to the magnetic gaps; and a means for aligning the magnetic tape to the magnetic heads in a vertical position on a reference level parallel to a track of the magnetic tape wherein the reference level is set on the upper surface of the lower flange and that is laterally extended to the magnetic head assembly to adjust a vertical position of the magnetic head thereon.

2. The magnetic tape apparatus according to claim 1, wherein the lower flange is separable from the shaft, the upper flange and the cylindrical roller of the roller guide and that is disposed directly on a upper surface of the base such that the roller guide is assembled after a vertical position of the magnetic heads is directly measured and compared with the reference level to adjust the vertical position.

3. The magnetic tape apparatus according to claim 1, wherein at least the upper surface of the lower flange is made of an abrasion resistant material.

4. The magnetic tape apparatus according to claim 1, wherein the lower flange is separable from the shaft, the upper flange and the cylindrical roller of the roller guide and that is disposed on the upper surface of the base with an elastic member in between, such that the vertical position of the upper surface of the lower flange coincides with a vertical position of the magnetic heads by adjusting the upper surface of the lower flange in a vertical position on the base.

5. The magnetic tape apparatus according to claim 4, wherein the elastic member is a compressed coil spring around the shaft of the roller guide whereby the upper surface of the lower flange is constantly pressed to a lower surface of a flange part of the shaft which determines an upper limit of the lower flange in the vertical position.

6. The magnetic tape apparatus according to claim 5, wherein the base has a cylindrical part surroundingly engaged with a lower part of the shaft such that an upper surface of the cylindrical part is gaplessly pressed to the lower surface of the flange part of the shaft, and that the compressed coil spring and the lower flange arc both engaged around the cylindrical part by a height of which determines the vertical position of the lower flange.

7. The magnetic tape apparatus according to claim 1, wherein the magnetic head assembly is disposed on a stage which is formed on an upper part of the base such that an inclination of the magnetic head assembly to the reference level is adjusted by inclining the stage.

8. The magnetic tape apparatus according to claim 1, wherein the lower flange has a detectable mark on a periphery whereby the vertical position of the lower flange is determined by comparing with the vertical position of the magnetic heads.

9. The magnetic tape apparatus according to claim 7, wherein the lower flange is associated with the shaft.

10. The magnetic tape apparatus according to claim 8, wherein the detectable mark is a keen edge on a periphery of the lower flange such that the keen edge is formed on the upper surface of the lower flange intersecting with a side wall facing to a direction same as the magnetic heads whereby the vertical position of the upper surface is directly measurable to adjust the vertical position of the magnetic assembly under a condition that the roller guide is disposed on the base.

11. The magnetic tape apparatus according to claim 10, wherein a steric hindrance is formed between the keen edge and the magnetic tape such that the keen edge is away from the magnetic tape.

12. The magnetic tape apparatus according to claim 10, wherein the keen edge is disposed behind the roller whereby the keen edge prevents from damaging the magnetic tape.

13. The magnetic tape apparatus according to claim 10, wherein the keen edge is provided by a notch formed on a periphery of the lower flange.

14. A method for aligning a magnetic tape to a magnetic head in a magnetic tape apparatus for reading data out or writing data in a magnetic tape by running the magnetic tape which comprises (1) a roller guide having a shaft, an upper flange, a lower flange, and a cylindrical roller, the shaft being fixed to a base such that the shaft is perpendicular to a front surface of the base, the cylindrical roller being concentrically rotatable with a bearing around the shaft on which the magnetic tape is running between the upper and lower flanges, the lower flange being located at a lower end of the cylindrical roller, and the upper flange being located at the upper end of the cylindrical roller such that a lower edge of the magnetic tape is constantly pressed to the upper surface of the lower flange, (2) a magnetic head assembly having a pair of magnetic gaps parallel to each other along which a pair of magnetic heads are formed side by side for reading and for writing, respectively, the magnetic head assembly being disposed on the base such that the magnetic gaps are perpendicular to the magnetic tape and that each of the magnetic heads coincide with a corresponding track of the magnetic tape in a vertical position when the magnetic tape is running in a direction perpendicular to the magnetic gaps, and (3) a means for aligning the magnetic tape to the magnetic heads in a vertical position on a reference level parallel to a track of the magnetic tape wherein the reference level is set on the upper surface of the lower flange and that is laterally extended to the magnetic head assembly to adjust a vertical position of the magnetic head thereon, the method comprising the steps of:

(a) providing a pair of the lower flanges having an identical thickness separately from the shaft, the upper flange and the cylindrical roller of corresponding roller guides in each site of the corresponding roller guides on the base such that the magnetic head assembly is disposed between a pair of the sites on the stage of the base;

(b) mounting a U-shaped parallel piped aligning jig having a keen edge at each end of both fingers on the lower flanges such that the keen edges face to the same direction as the magnetic heads face;

(c) measuring each vertical position of the keen edges and magnetic heads directly by tool makers microscope; and (d) adjusting the vertical position of the magnetic heads to a track of the magnetic tape.

15. The method according to claim 14, wherein in the step (d), the vertical position of the magnetic head is determined to be higher than the vertical position of the keen edges by such a distance as a spacing between the track and a lower edge of the magnetic tape.

16. A method for aligning a magnetic tape to a magnetic head in a magnetic tape apparatus for reading data out or writing data in a magnetic tape by running the magnetic tape which comprises, (1) a roller guide having a shaft, an upper flange, a lower flange, and a cylindrical roller, the shaft being fixed to a base such that the shaft is perpendicular to a front surface of the base, the cylindrical roller being concentrically rotatable with a bearing around the shaft on which the magnetic tape is running between the upper and lower flanges, the lower flange being located at a lower end of the cylindrical roller, and the upper flange being located at an upper end of the cylindrical roller such that a lower edge of the magnetic tape is constantly pressed to the upper surface of the lower flange, where the lower flange is disposed on the upper surface of the base with an compressed coil spring in between, whereby the upper surface of the lower flange is constantly pressed to a lower surface of a flange part of the shaft, while the base has a cylindrical part surroundingly engaged with a lower part of the shaft such that a top surface of the cylindrical part is gaplessly pressed to the lower surface of the flange part of the shaft, and that the compressed coil spring and the lower flange are both engaged around the cylindrical part a height of which determines the vertical position of the lower flange, (2) a magnetic head assembly having a pair of magnetic gaps parallel to each other along which a pair of magnetic heads are formed side by side for reading and for writing, respectively, the magnetic head assembly being disposed on the base such that the magnetic gaps are perpendicular to the magnetic tape and that each of the magnetic heads coincide with a corresponding track of the magnetic tape in a vertical position when the magnetic tape is running in a direction perpendicular to the magnetic gaps, and (3) a means for aligning the magnetic tape to the magnetic heads in a vertical position on a first reference level parallel to a track of the magnetic tape wherein the first reference level is set on the upper surface of the lower flange and that is laterally extended to the magnetic head assembly to adjust a vertical position of the magnetic heads thereon, the method comprising the steps of:

(a) adjusting a pair of the cylindrical parts of the base for the roller guides guiding the magnetic tape to the magnetic head assembly located therebetween such that the cylindrical parts have identical height; where the lower flanges of the roller guides have different thickness;

(b) mounting the roller guides on the base such that the lower surface of the flange part of the shaft is gaplessly pressed to the top surface of the cylindrical parts of the base, and that the upper surface of the lower flange is identically leveled to the top surface of the cylindrical parts of the base;

(c) setting a second reference level on each top surface of the cylindrical parts of the base, wherein the first reference level is extending to the magnetic head assembly;

(d) measuring a difference in a vertical position between the magnetic head and the second reference level on the magnetic head assembly;

(e) adjusting the difference by changing the vertical position of the magnetic head assembly such that the magnetic head coincides to a track of the magnetic tape; and (f) taking the second reference level for the first reference level.

17. The method according to claim 16, further comprising a step of adjusting an inclination of a stage on which the magnetic head assembly is mounted such that a pair of magnetic heads for reading and writing located side by side are parallel to the reference level.

18. A method for aligning a magnetic tape to a magnetic head in a magnetic tape apparatus for reading data out or writing data in a magnetic tape by running the magnetic tape which comprises (1) a roller guide having a shaft, an upper flange, a lower flange, and a cylindrical roller, the shaft being fixed to a base such that the shaft is perpendicular to a front surface of the base, the cylindrical roller being concentrically rotatable with a bearing around the shaft on which the magnetic tape is running between the upper and lower flanges, the lower flange being located at a lower end of the cylindrical roller, and the upper flange being located at an upper end of the cylindrical roller such that a lower edge of the magnetic tape is constantly pressed to the upper surface of the lower flange, (2) a magnetic head assembly having a pair of magnetic gaps parallel to each other along which a pair of magnetic heads are formed side by side for reading and for writing, respectively, the magnetic head assembly being disposed on the base such that the magnetic gaps are perpendicular to the magnetic tape and that each of the magnetic heads coincide with a corresponding track of the magnetic tape in a vertical position when the magnetic tape is running in a direction perpendicular to the magnetic gaps, and (3) a means for aligning the magnetic tape to the magnetic heads in a vertical position on a first reference level parallel to a track of the magnetic tape wherein the first reference level is set on the upper surface of the lower flange and that is laterally extended to the magnetic head assembly to adjust a vertical position of the magnetic head thereon, the method comprising the steps of:

(a) mounting a pair of the roller guides guiding the magnetic tape to the magnetic head assembly located therebetween on the base, wherein each of the lower flanges has a keen edge on a periphery of the lower flange such that the keen edge is formed on the upper surface of the lower flange intersecting with a side wall facing to a direction same as the magnetic heads;

(b) setting a second reference level such that the second reference level is coincides with a line extended from the keen edges belonged by the lower flanges in both sides;

(c) measuring a difference in a vertical position between the magnetic head and the second reference level on the magnetic head assembly;

(d) adjusting the difference by changing a vertical position of the magnetic head assembly such that the magnetic head coincides to a track of a magnetic tape; and (e) taking the second reference level for the first reference level.

\* \* \* \* \*

UNITED STATES PATENT AND TRADEMARK OFFICE
CERTIFICATE OF CORRECTION

Figure 1:
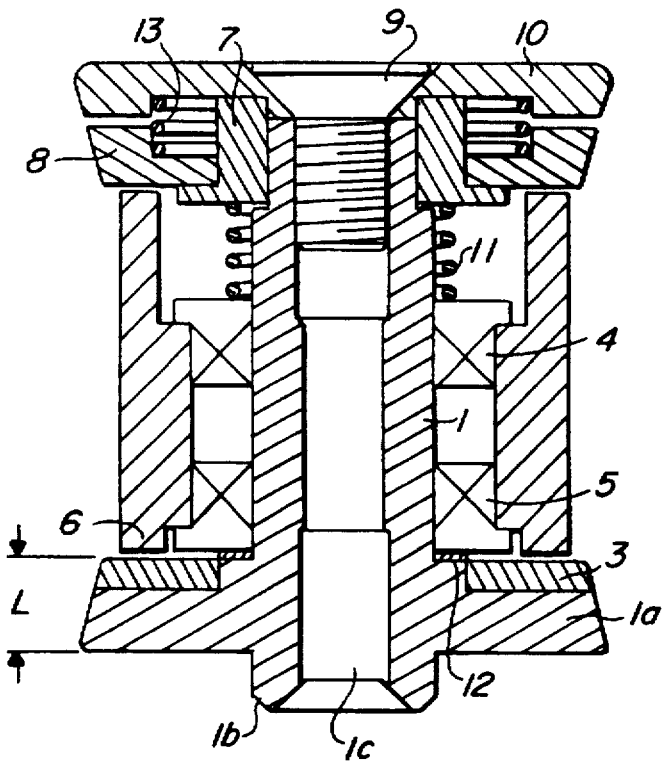
FIG. 1 is a cross-sectional view of a conventional roller guide in a magnetic tape apparatus.
Figure 2:
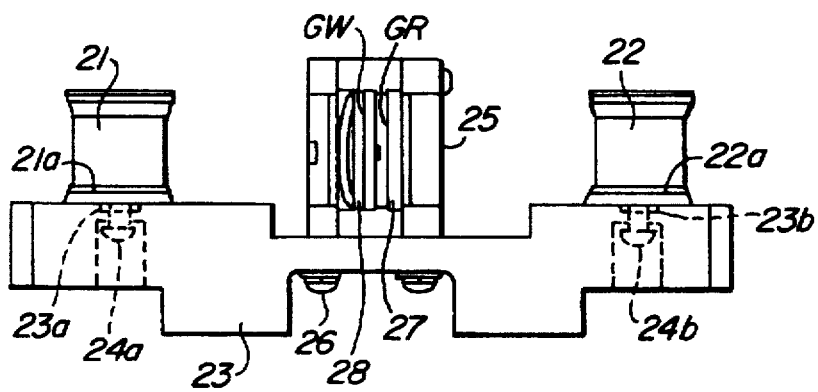
FIG. 2 is a cross-sectional view of a pair of the conventional roller guides and a magnetic head assembly on a base related to FIG. 1.
Figure 3B:
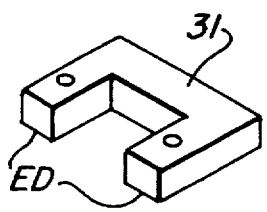
FIG. 3 is a cross-sectional view of a U-shaped parallel piped jig and the magnetic head assembly on the base related to FIG. 2.
Figure 3A:
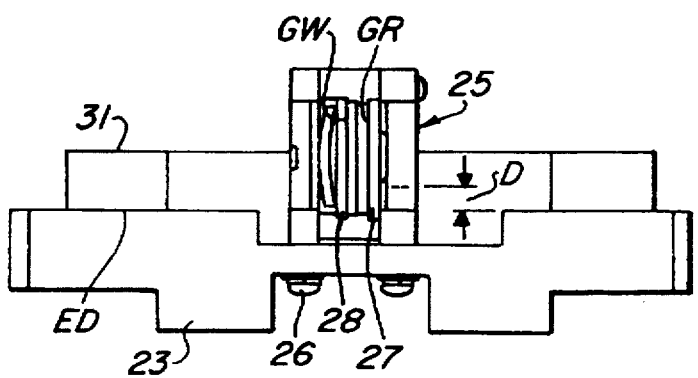

PATENT NO. : 5,798,892
DATED : August 25, 1998
INVENTOR(S) : Masayoshi Kobayashi It is certified that error appears in the above-identified patent and that said Letters Patent is hereby corrected as shown below:

On the title page,

Under "[57] Abstract" delete "is the" and insert --is adjustable relative to the-- therefor Column 1, line 23, delete "tape-track" and insert --tape (track)-- therefor Column 1, line 40, delete "axis" and insert --axis of-- therefor Column 2, line 10, delete "FIG. 3" and insert --FIG. 3A-- therefor

UNITED STATES PATENT AND TRADEMARK OFFICE
CERTIFICATE OF CORRECTION

PATENT NO. : 5,798,892
DATED : August 25, 1998
INVENTOR(S) : Masayoshi Kobayashi It is certified that error appears in the above-identified patent and that said Letters Patent is hereby corrected as shown below:

Column 2, line 14, after "jig 31" insert --, as shown in more detail in FIG. 3B,-- therefor Column 2, line 39 delete "an"

Column 2, line 52, delete "out/in" and insert --from /to-- therefor

Column 3, line 42, delete "FIG. 3" and insert --FIG. 3A-- therefor

Column 3, between lines 44 and 45, start a new paragraph --FIG. 3B is a perspective view of a u-shaped parallel piped jig related to FIG. 3A.--

UNITED STATES PATENT AND TRADEMARK OFFICE
CERTIFICATE OF CORRECTION

PATENT NO. : 5,798,892        Page 3 of 4
DATED : August 25, 1998
INVENTOR(S) : Masayoshi Kobayashi It is certified that error appears in the above-identified patent and that said Letters Patent is hereby corrected as shown below:

Column 4, line 46, delete "out/in" and insert

--from /to-- therefor

Column 4, line 51, delete "lead" and insert

--leader-- therefor

Column 5, line 2, delete "steal" and insert

--steel-- therefor

Column 5, line 64, delete "out/in" and insert

--from/to-- therefor

Column 6, line 41, delete "a"

UNITED STATES PATENT AND TRADEMARK OFFICE
CERTIFICATE OF CORRECTION

PATENT NO.   : 5,798,892
DATED        : August 25, 1998
INVENTOR(S)  : Masayoshi Kobayashi It is certified that error appears in the above-identified patent and that said Letters Patent is hereby corrected as shown below:

Column 8, line 64, delete "arc" and insert

--are-- therefor

Signed and Sealed this

Eighth Day of June, 1999

Q. TODD DICKINSON

*Attest:*

*Attesting Officer*        *Acting Commissioner of Patents and Trademarks*